March 13, 1962 F. C. SCHWANEKE 3,025,384
THERMOSTAT FOR SKILLET
Filed June 26, 1956 2 Sheets-Sheet 1

INVENTOR:
FRED C. SCHWANEKE
BY
ATTORNEY

March 13, 1962  F. C. SCHWANEKE  3,025,384
THERMOSTAT FOR SKILLET
Filed June 26, 1956  2 Sheets-Sheet 2
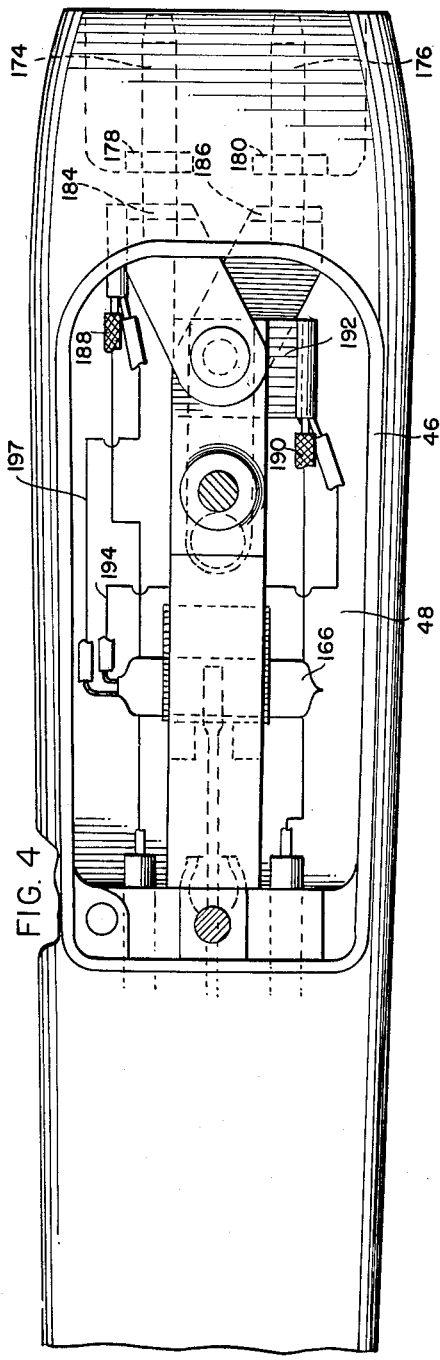
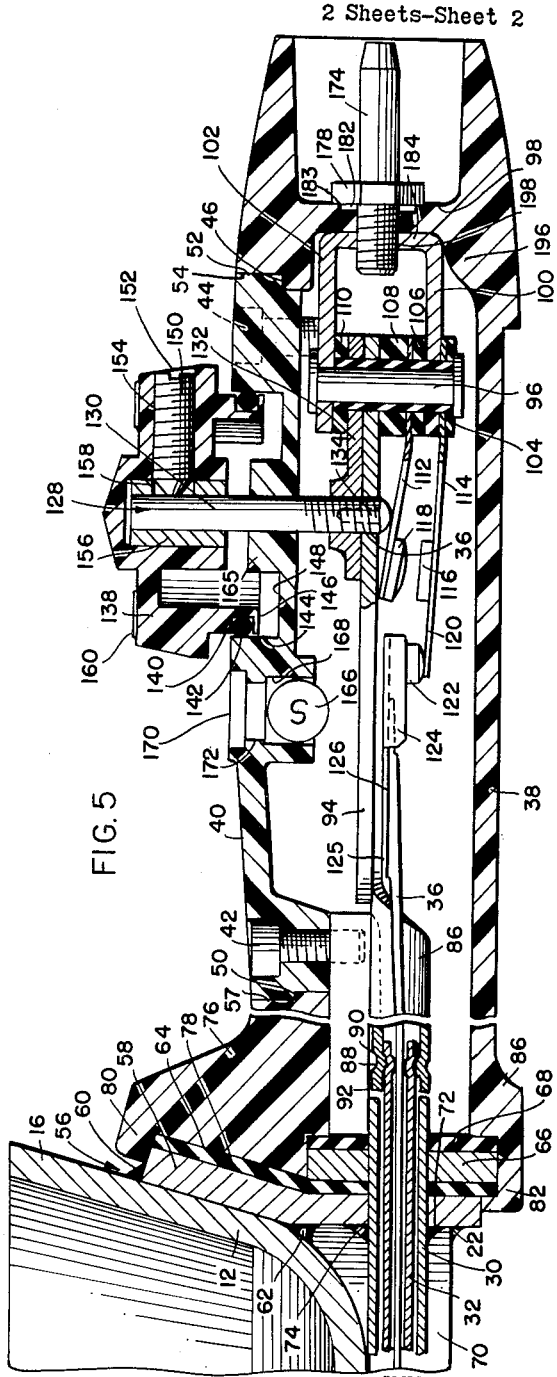
INVENTOR:
FRED C. SCHWANEKE
BY
ATTORNEY

# United States Patent Office 3,025,384
Patented Mar. 13, 1962

3,025,384
THERMOSTAT FOR SKILLET
Fred C. Schwaneke, Chicago, Ill., assignor to Dormeyer Corporation, Chicago, Ill., a corporation of Illinois
Filed June 26, 1956, Ser. No. 594,017
1 Claim. (Cl. 219—44)

This invention relates to automatically controlled electrically energized skillets and more particularly to an automatic electrical skillet and thermostatic control means therefor, which is adapted to provide a very effective control of temperature at a given setting without the necessity for unusually close tolerances in manufacture of the device.

Heretofore it has been necessary to provide a skillet having a high degree of accuracy in manufacture so that variations in the parts would not effect an undue change in the calibration of the device. Furthermore, during operation such devices have usually been subject to heat warping which further interferes with effective temperature control.

It is therefore an object of the invention to proivde a thermostat particularly adapted for use with a skillet which will accommodate variations in the construction of the handle of the skillet in which the thermostat is housed, and which will permit a certain amount of play or thermally induced change in the parts of the handle without damaging the calibration of the device.

A further object of the invention is to provide means for thermostatic control within a predetermined limited temperature range for a given temperature setting which will insure uniform cooking temperatures in practice.

Another object of the invention is to provide a thermostatic control which may be readily assembled in an extremely solid and firm structure with the parts thereof properly aligned as guided by particular elements of the handle.

Another object of the invention is to provide a skillet and thermostatic control means which may be very solidly secured together by means of a particular bracket construction for use in connecting the handle and the skillet.

Another object of the invention is to provide thermally responsive differential expansion means for the thermostat having a unique arrangement of elongate tubular elements and control elements whereby given temperature changes may be transmitted directly to thermostatic control switch elements but which, nevertheless, permits adjustment of non-essential parts of the control including the handle and other housing elements.

Other objects and advantages of the invention will become apparent as the description proceeds in accordance with the drawings in which:

FIG. 4 is a fragmentary plan view of the thermostatic control in assembled position in the handle;

FIG. 5 is a vertical sectional view of the thermostatic control handle and skillet taken along the lines 5—5 of FIG. 1.

The problem of manufacturing a suitable skillet having adequate controls for temperatures in the ranges used in commercial or household cooking has been complicated by the fact that these utensils must be manufactured in mass production. Undesirably close tolerances must be avoided if possible, but the degree of temperature control required has heretofore entailed highly accurate construction which interferes with mass production. A further problem is the fact that it is desirable to calibrate such an instrument within a margin of error or control range which is reasonably accurate and which yet can be determined in accordance with the specific heat limits of the device.

The design of a suitable thermostatic control therefore involves the application of concepts which are very precise to equipment which is constructed with ordinary manufacturing tolerances and where accuracy of control must be maintained despite such variations.

I have found that a desirable means for achieving a high degree of control and for amplifying given thermal changes in a cooking utensil is the use of elongate thermostatic elements having predetermined differing coefficients of thermal expansion. I have also been able to use such elongate differential expansion means without at the same time limiting the possibilities of using ordinary manufacturing methods.

Figure 1:
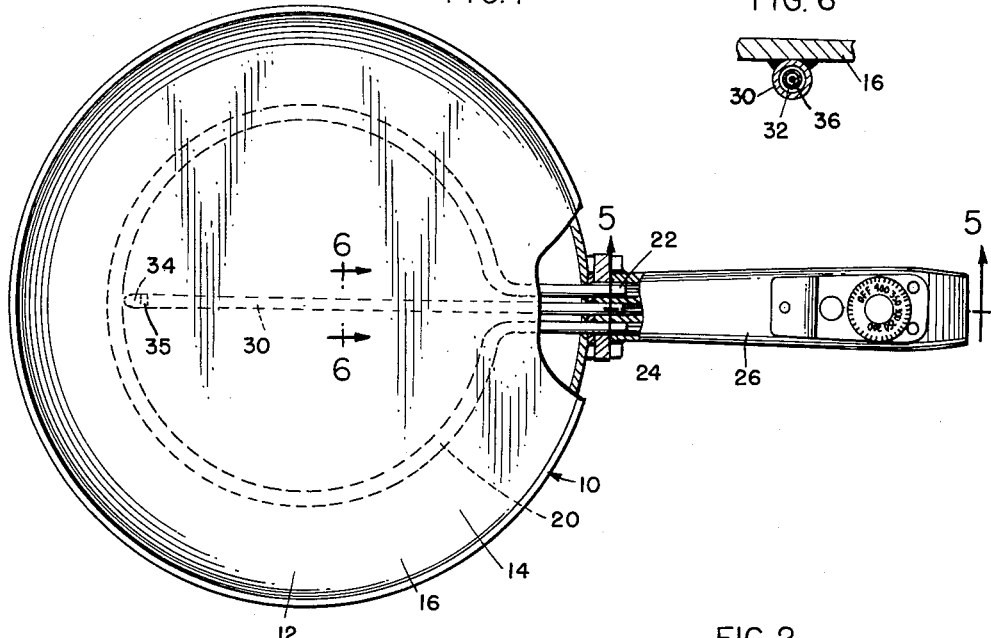
FIG. 1 is a top plan view partly broken away of a skillet and thermostatic control according to the present invention.
Figure 6:
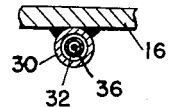
FIG. 6 is a vertical sectional view of the thermostat of the invention taken along the lines 6—6 of FIG. 1.
Figure 2:
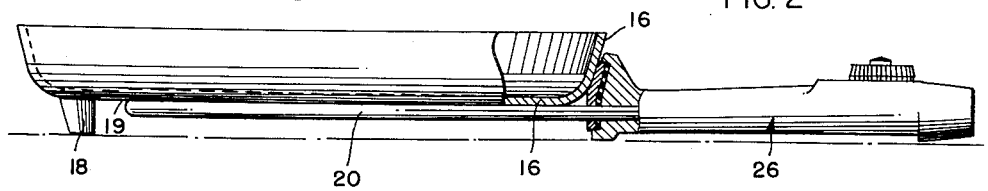
FIG. 2 is a side elevational view of the device of FIG. 1.
Figure 3:
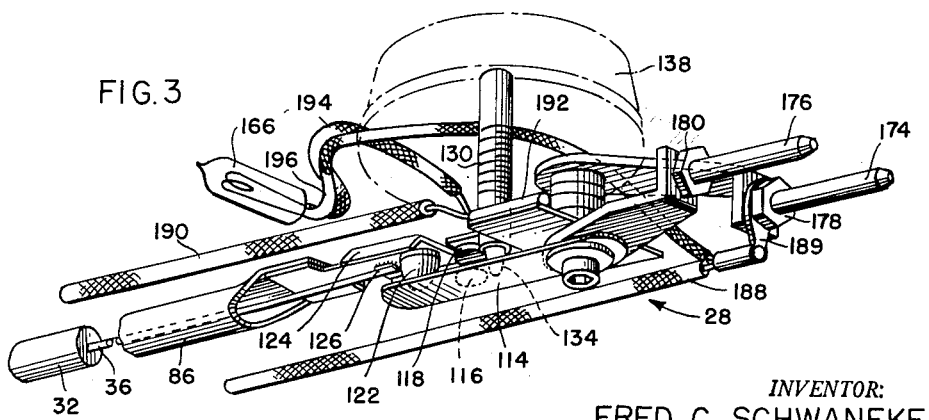
FIG. 3 is a perspective view of a portion of the thermostatic control of the invention.

As seen in FIG. 1, the skillet 10 of the invention comprises a pan 12 having a flat bottom wall 14 and an inclined side wall 16, the bottom wall 14 having circumferentially spaced legs 18 which are preferably integrally formed with the pan bottom 14. The pan is preferably formed of aluminum, stainless steel, or a similar material of good heat conductivity, and bonded or brazed to the bottom surface of the wall 14, as best shown at 19 in FIG. 2, is a substantially circular heating element or Calrod 20. This type of heating element provides a continuous sheath for the electrical element and in the present embodiment has outwardly extending arms 22 and 24 as will hereinafter be further described. The arms 22 and 24 extend past the wall 16 and into a handle or grip 26 adapted to be connected to a plug (not shown) for supplying electrical current to the skillet from a conventional electrical outlet.

According to the present invention, theremostatic control means 28 are provided for controlling the electrical circuit within a predetermined temperature range and for this purpose a hollow tube 30 is brazed to the under surface of the bottom wall 14 of the pan section 12 preferably along a central diameter thereof within the area of the heating element 20. Accordingly, the thermostat will be responsive to the main temperature of the bottom wall 14 to provide a uniform heat level therein.

The tube portion 30 is preferably formed of a metal with a high coefficient of heat conductivity and it is preferred to use aluminum for this purpose, the tube extending beyond the pan between the arms 22 and 24 substantially parallel therewith. Referring to FIGS. 1 and 5, it will be observed that the tube 30 terminates at a predetermined distance slightly beyond the outer wall 16 of the skillet.

In order that a uniform temperature responsive to the temperature of the pan bottom 14 may be utilized for the thermostatic control 28, a second inner concentrically and axially aligned aluminum tube 32 is provided within the tube 30 which is freely floating adjacent the terminal point 34 at the pan bottom and at the point where the tube approaches the circle formed by the Calrod 20. In order to provide for a differential expansion response to control the thermostat 28, an elongate metallic rod 36, preferably of stainless steel but in any event of relatively lower coefficient of heat expansion as compared with the tube 32, is provided coaxially within the tube 32, and fastened by crimping or other suitable means to the end 35 of tube 32 adjacent point 34. The rod 36 extends freely within tube 32 and outwardly thereof for a predetermined distance as will be hereinafter further described. It is not essential that all contact along the respective elongate elements 30 and 32, and between 32 and 36 be prevented, and in fact, a certain amount of such contact is desirable so that the heat exchange for thermostatic control may be both by conduction and convection. It is believed that this arrangement provides for averaging out undue temperature gradients which might result from the exclusive use of any one mode of heat transmission.

As best seen in FIGS. 4 and 5, the hand grip 26 for housing the circuit making and breaking portions of the thermostatic control 28 comprises an elongate hollow shell of thermally resistant material such as Bakelite and referred to by numeral 38. In order to permit ready assembly of the respective parts of the control element 28 in the handle 38, a plate or cover 40 is provided which may be bolted to the handle by means of bolts such as bolts 42 and 44. It is desirable to provide for accurate seating of the cover 40, and therefore a shelf 46 is formed peripherally around the opening 48 defined by the casing 38 on which the complementary ledge 50 of the plate 40 may be disposed in firm engagement. Also, an upright peripheral wall 52 is provided in the casing to engage with the upright wall 54 of the plate 40.

The handle 38 is preferably secured to the pan 12 by means of a bracket referred to generally by reference numeral 56 and comprising a plate 58 which is inclined at its upward portion to engage with the wall 16 of the pan, as secured thereto by suitable welding or brazing 60 and 62. A rubber silicone layer 64 abuts the plate 58 and a disc 66 engages this layer while a gasket 68 is disposed on the other side of the disc 66. A suitable metallic matrix 70 may be brazed or otherwise bonded to the pan 12 around the tubes 30 and 22 and 24, and may be likewise secured to the plate 58 by brazing 72 and 74 to afford a firm positioning for the parts embedded therein. The casing 38 is provided with a relatively thick boss 76 for seating solidly against the bracket 56 and accordingly an inclined wall 78 is defined therein adapted to engage with the rubber silicone plate 64 and an extension or shoulder 80 is provided for snug engagement with the bracket plate 58 while a corresponding extension 82 engages the disc 66.

If desired and in order to insure a solid and rigid fit between the handle 26 and the pan 12, a bolt (not shown) may be provided which extends through the bracket 58 and the disc 66 into threaded engagement with the casing 38.

Since the tube 32 and rod 36 secured thereto at 35 are, as stated, free floating within the tube 30, they must be anchored in the handle 26 in such a way as to ensure accurate relative expansion between the rod 36 and the tube 32. As stated above, this would normally require extremely close manufacturing tolerances in order to prevent inaccuracies in the calibration. Even then differences in temperature in the respective handle parts would ordinarily cause warping during cooking. In order to overcome this difficulty, the portions of the thermostat 28 which are retained in the handle 26 are secured to the tube 32 in a particular manner which affords a certain amount of play between the parts secured to the handle and the parts secured to the skillet. As seen in FIG. 5, the terminal portion of the tube 32 outside the pan 12 is fastened to a tube 86 which is preferably of a metal having relatively low coefficient of heat expansion such as stainless steel and corresponding to the material forming the rod 36. The manner in which the tube 32 is secured to the tube 86 is preferably by crimping the elements together as shown by indentations 88 and 90 in the tubes 86 and 32 respectively. Thus the tube 86 terminates at a position on the tube 32 which is somewhat short of the terminal position of the external tube 30 to provide a gap 92 therebetween which will continue to exist during all temperature ranges of the device.

This spaced relation between tube 86 and tube 30 affords a solid and fixed base point for the tube 32, whereby the expansion and contraction of the tube can actuate the rod 36 in a manner determined by the initial calibration of the device, as hereinafter described. Accordingly, the tube 86 is brazed to a bus bar 94 which in turn is held by a bolt or elongate rivet 96 in fixed relation to a vertical wall 98 of the casing 38 by means of a pair of brackets 100 and 102 as will be hereinafter further described. Thus the rivet 96 is preferably provided with a cylindrical bearing 104 on which the bus bar 94 is positioned by means of a plurality of washers 106, 108 and 110 which holds a pair of switch blades 112 and 114 in predetermined spaced and parallel relation, the switch blade 114 being normally biased upwardly to maintain a contact 116 in spaced relation to a contact 118 on the blade 112.

In order to provide for thermostatic control in response to the rod 36, the switch blade 114 has an extension 120 which is biased upwardly into engagement with a button 122 carried by a bracket 124 which is brazed to the tube 86. The rod 36 is brazed to the bracket as indicated at 126. Tension exerted on bracket 124 by rod 36 serves to pull the button 122 downwardly and thereby move extension 120 downwardly, since this bracket is fastened to tube 86 at a point 125 spaced toward end 35 of tube 32 a predetermined amount. The bracket 124 is preferably a suitable metal such as spring steel for this purpose.

In order to determine a desired calibration or setting of the thermostat 28, an elongate bolt assembly 128 is provided including a bolt 130 which is threadedly received in a bracket 132 secured on the bearing 104, and in the bus bar 94. The bolt 130 carries at one end a refractory pin 134 of a suitable ceramic material which is press-fitted into a recess 136 of the bolt 130 according to a preferred method described in my application Serial No. 481,366, now Patent No. 2,795,673, granted June 11, 1957. The pin 134 is therefore adapted to bear against the switch blade 112 so as to determine the relative spacing between the contacts 116 and 118. In order to provide for manual adjustment of the thermostat, a dial 138 is provided having a recess 140 therearound for receiving an O-ring 142 adapted to engage with the side wall of annular configuration 144 defined in the plate 40 and having a lower wall 146 adapted to abut the bottom wall 148 in the plate as hereinafter further described. The dial 138 is secured to the bolt 130 by means of a set screw 150 having a kerf 152 and threadedly engaged in a recess 154 perpendicular to the bolt 130. It is preferred that a bearing sleeve 156 be provided for the bolt 130, and this sleeve has a recess 158 for receiving the set screw 150.

In order to disclose the temperature settings, the dial 138 is provided with external indicia 160 corresponding to limits which may be defined by a plate affixed to the plate 40 on the bottom wall 148 thereof, the dial 138 then being provided with a shoulder (not shown) adapted to engage selectively with radially spaced shoulders in the plate. As best seen in FIG. 4, the plate 40 also carries a signal light 166 which is retained in a recess 168 in the plate 40 by means of a suitable glue which is sufficiently heat resistant, and it is preferred that a plate of glass or other transparent material 170 be fastened to the annular shoulder 172 of the plate 40 above the light 168 as shown. The light is adapted to glow in response to energization of the circuit, which is accomplished by means now to be described.

A pair of stud bolts 174 and 176 are secured to the brackets 100 and 102 respectively in threaded engagement therewith as held by nuts 178 and 180, which in the assembled position of the device abut the wall 98. A gasket 182 is preferably secured between the nut 178 and the wall 98, a recess 183 being provided therefor in said wall, and a corresponding gasket is provided for the bolt 176. Accordingly, the entire thermostat assembly 28 is held securely and solidly by means of the upstanding flanges 184 and 186 on the respective brackets 100 and 102.

A pair of pigtails 188 and 190 are mounted on the thermostat 28 with the pigtail 188 having a bracket 189 engaging the bolt 174 and the pigtail 190 preferably being secured to the spring blade 114 by means of an extension 192 thereof. These leads are received in suitable channels in the sides of the casing 38 and are engaged with the terminals 22 and 24 of the Calrod 20 by suitable clips (not shown) at the time that the handle is secured to the pan 12. Thus when the bolts 174 and 176 are connected to a plug and an outlet as described, but not shown, and when the contacts 116 and 118 are engaged, current from the plug will complete a circuit from bolt 176 and bracket 100 through spring blade 114 and thence through spring blade 112 to pigtail 190. The pigtail 188 is connected to bolt 174 through bracket 102. The light 166 is provided with leads 194 and 197 which are engaged by soldering or the like at the other end to the pigtails 190 and 188 respectively, so that the circuit also energizes the light 168.

The matter of assembly of the handle is extremely important in providing a secure foundation or setting for the thermostat and in particular, the tube 32 and rod 36 which are freely floating within tube 30. In accomplishing this, the casing 38 is secured to the pan 12 in the manner indicated and by means of the bracket 56. The bracket plate 58 and the disc 66 therefor provide an exceptionally firm and rigid positioning for the tube 30 as well as the extensions 22 and 24. In the initial condition of the handle 26 the plate 40 will be removed from casing 38, and the thermostatic assembly 28 may therefore be inserted bodily and as a unit into the interior of the casing 38.

As stated, tube 32 extends a predetermined distance into casing 38 such as to provide for spacing with respect to tube 86. This construction permits the brackets 100 and 102 to have a certain amount of leeway with respect to the wall 98. Therefore, a rounded cam construction 196 is provided in the casing 38 and the lowermost bracket 100 is cammed upwardly thereover and into solid engagement with the wall 98, with apertures 198 and 200 in registration with corresponding apertures in the wall 98 through which the bolts 174 and 176 are to be inserted. With the upright extensions 184 and 186 in position, the bolts themselves are inserted through the apertures in the wall 98 and are threadedly engaged in the apertures 198 and 200 in the respective brackets 100 and 102. The nuts 178 and 180 are thereupon tightened against the wall 98 to draw the brackets and their uprights into firm abutting engagement therewith. As hereinbefore described, the engagement of the brackets 100 and 102 against the wall 98 positions the rivet 96 in predetermined spaced relation thereto and accordingly also holds the tube 86 in a predetermined spaced relation to the tube 30. It is at this point that the crimping operation shown at 88 and 90 may be completed.

Thereupon, the plate 40 is set upon the shoulder 46 which is, as stated, an accurately formed flat plane in the preferred form thereof, and the bolt 130 is calibrated with respect to the dial 138 in the following manner.

First of all, the skillet is heated to the upper limit thereof by moving the bolt downwardly a sufficient distance to place the contacts 116 and 118 firmly together. Once this limit has been determined, the bolt 130 is rotated in the other direction to move it upwardly a very slight amount sufficient to cause the contacts to be almost separated so that the highest temperature is not quite attained and the circuit is made and broken frequently. Thereupon, the dial 138 is rotated or positioned on the stud 130 to a position where the highest temperature reading corresponds to the limit thus determined and the set screw 150 is turned into home engagement with the bolt.

The wall 146 of the dial will be pressed downwardly to the full extent in providing the limit position thereon, and the shoulder 163 will contact one of the shoulders such as shoulder 164 at such time.

Disassembly of the thermostat is likewise a relatively uncomplicated matter because the bolts 42 and 44 may be unscrewed and the thermostat setscrew pin 150 loosened to permit the dial to be taken off the thermostat. Thereupon the plate may be bodily lifted off. At such time the thermostat is exposed and repairs may be made if desired.

The O-ring 142 in the dial 138 will ride up and down readily against the wall 144 of the plate both in the initial adjustment and during setting of the thermostat. Once the setting is made, the switchblade 114 will be in a predetermined position carrying the contact 118 at a relative position such that the button 116 will move downwardly therefrom when the temperature desired is attained. As stated, this is accomplished by the relative expansion of the metallic tube 32 in response to the heat in the plate bottom 14. Thus when the contact is to be broken, the tube 32 will, after heating, expand a greater distance than rod 36, which is of relatively low coefficient of expansion to provide a greater increment of length than the rod 36. This is possible because end 35 of tube 32 and rod 36 are freely floating in tube 30, and will serve to create a pull on the rod 36 whereby to create the tension on the bracket 124 necessary to move the button 122 downwardly. This movement causes the blade 112 to move downwardly a corresponding distance thereby separating the contacts.

When the parts have cooled sufficiently, the rod 36 once again will expand relative to tube 32 with its lower expansion coefficient to provide an increment of length sufficient to move the button or contact 118 into electrical engagement with the contact 116 and to cause the light 166 to glow. And upon continued heating, the relative expansion of the tube 32 with respect to rod 36 again creates a tension or a pull against the rod 36 and a corresponding circuit-breaking action.

Although under no-load conditions, the differential between the on-and-off temperatures of the thermostat is as much as 40° C., the device in actual use and under load has a temperature differential of between 5° and 10° C. This is sufficient to provide a uniform temperature in the wall 14 which satisfies the most demanding cooking requirements.

Because the rod 36 will remain in expanded condition somewhat longer than tube 32, in part due to its protected position as the innermost element within tube 30, a desirable anticipating effect is achieved so that the contraction of tube 32 which will occur upon cooling of the bottom wall 14 of the skillet will produce compression force on rod 36 more quickly than would otherwise develop and thereby achieve a closing of the circuit when the bottom wall has cooled to the predetermined extent without substantial lag. And the converse effect will occur during the heating cycle.

The concentric arrangements of the tubes 30 and 32 around the rod 36 and the partial contact of the tubes and the rod provide a uniform distribution of temperature along the rod 36 to produce a highly reliable and effective on-and-off or circuit-breaking action.

The device is simple in construction and upon the initial calibration being completed, little or no further adjustment is required. The solid assembly of the parts insures that there will be little breakage in use and that the utensil will have a long life. And the spacing between the respective elements secured to the handle and to the pan as indicated at 92 affords an independence of the handle structure and the physical changes induced by temperature change which renders the thermostat completely reliable in use.

Although I have herein set forth and described my invention with respect to certain specific embodiments and certain details and principles thereof, it will be understood by those skilled in the art that these may be varied as desired within the scope of the invention without departing from the spirit and scope thereof as set forth in the hereunto appended claim.

I claim:

In a cooking utensil having a bottom wall of good heat conductivity, a heating element secured to said bottom wall and a handle including a casing and means for securing said casing to said utensil, a cover plate adapted to seat in predetermined position on said casing and fastening means for said cover, a thermostatic control comprising an elongate tube secured to the bottom wall in intimate heat exchange relationship therewith and extending into said handle a predetermined distance and having good heat conductivity, an elongate tube of a metal of good coefficient of heat expansion and an elongate rod of relatively low coefficient of heat expansion, said second tube and said rod being joined within said first tube for free floating positioning therein, a switch means for controlling the circuit of said heating element including a pair of switch blades, means for securing said switch in fixed position in said handle, a third tube of relatively low coefficient of expansion secured to the other end of said second tube in predetermined spaced relation to said first tube whereby variatives in the construction of said handle and utensil and thermally-induced changes therein are prevented from interfering with said thermostatic control, a bus bar fixedly secured to said means for said switch, said third tube being fastened to said bus bar, a bracket secured to said third tube, said rod being secured at its other end to said bracket in predetermined spaced relation to the point at which said bracket is secured to said tube, one of said blades being biased into engagement with said bracket whereby to effect opening and closing of said switch in response to thermally-induced changes in the length of said second tube relative to the length of said rod and a pin assembly adjustably mounted in said cover including a pin threadedly engaged in said bus bar and bearing against said other blade for determining a temperature setting for said utensil.

References Cited in the file of this patent

UNITED STATES PATENTS

| | | |
|---|---|---|
| 1,723,239 | Howe | Aug. 6, 1929 |
| 1,902,451 | Johnson | Mar. 21, 1933 |
| 2,221,907 | Bondurant | Nov. 19, 1940 |
| 2,332,212 | Fillo | Oct. 19, 1943 |
| 2,529,941 | Hollister | Nov. 14, 1950 |
| 2,744,995 | Jepson | May 8, 1956 |
| 2,769,878 | Krichton | Nov. 6, 1956 |
| 2,793,270 | Burch et al. | May 21, 1957 |

FOREIGN PATENTS

| | | |
|---|---|---|
| 458,900 | Great Britain | Dec. 29, 1936 |